United States Patent
Jones (10) Patent No.: US 10,253,797 B2
(45) Date of Patent: Apr. 9, 2019

(54) MECHANICAL COUPLING DEVICES

(71) Applicant: Windspeed Limited, Rhyl (GB)

(72) Inventor: Richard John Parry Jones, Rhyl (GB)

(73) Assignee: WINDSPEED LIMITED, Rhyl (GB)

( * ) Notice: Subject to any disclaimer, the term of this patent is extended or adjusted under 35 U.S.C. 154(b) by 747 days.

(21) Appl. No.: 14/659,590

(22) Filed: Mar. 16, 2015

(65) Prior Publication Data
US 2015/0323015 A1 Nov. 12, 2015

(30) Foreign Application Priority Data
Mar. 14, 2014 (GB) .................... 1404611.4

(51) Int. Cl.
| F16B 7/04 | (2006.01) |
| F16D 1/08 | (2006.01) |
| F16D 1/112 | (2006.01) |
| G01P 5/06 | (2006.01) |

(52) U.S. Cl.
CPC ........... *F16B 7/042* (2013.01); *F16B 7/0413* (2013.01); *F16D 1/0817* (2013.01); *F16D 1/112* (2013.01); *G01P 5/065* (2013.01); *Y10T 403/587* (2015.01)

(58) Field of Classification Search
CPC ............ Y10T 403/587; Y10T 403/592; Y10T 403/7073; Y10T 403/7075; F16B 7/0413; F16B 7/042; F16B 21/165; F16D 1/112
USPC ............... 403/319, 322.2, 375, 376; 464/139
See application file for complete search history.

(56) References Cited

U.S. PATENT DOCUMENTS

| 1,054,126 A * | 2/1913 | Lindberg ............ B23B 31/1071 279/75 |
| 1,119,528 A * | 12/1914 | Nieman ................ B23B 27/007 408/197 |
| 2,399,581 A * | 4/1946 | Spooner ................... B60D 1/02 24/453 |
| 2,646,669 A * | 7/1953 | Barbier ................... F16D 3/221 464/139 |
| 2,693,980 A * | 11/1954 | Heidman, Jr. ....... B64D 17/383 24/607 |
| 3,901,056 A * | 8/1975 | Coolidge ................ G01P 13/02 70/188 |
| 4,391,543 A * | 7/1983 | Elsing ................... G11B 17/038 206/308.3 |
| 4,431,334 A * | 2/1984 | Cleveland ............... F16D 1/116 403/317 |

(Continued)

FOREIGN PATENT DOCUMENTS

| GB | 1340342 A | 12/1973 |
| GB | 1418747 A | 12/1975 |

*Primary Examiner* — Josh Skroupa
*Assistant Examiner* — Cory B Siegert
(74) *Attorney, Agent, or Firm* — Brian R. Galvin; Galvin Patent Law, LLC (57) ABSTRACT

A mechanical coupling for rotary devices, whereby a wind vane or other rotary tool, can be replaced without the use of a tool. In a preferred embodiment, the invention provides a coupling arrangement for a rotary device and a spindle supported for rotation, the coupling being enabled by a resilient body which acts upon a spheroidal locking member such as a ball bearing. In particular, the present invention provides a coupling arrangement for a wind vane or an anemometer rotating body comprising impeller cups, which impeller cups and rotating body are required for removable fitment, without the use of tools.

13 Claims, 6 Drawing Sheets

(56) References Cited

U.S. PATENT DOCUMENTS

| | | | | |
|---|---|---|---|---|
| 4,643,472 A * | 2/1987 | Schukei | ................... | B66C 1/56 |
| | | | | 294/82.28 |
| 4,708,040 A * | 11/1987 | Erickson | ............... | B23B 29/046 |
| | | | | 403/322.2 |
| 4,709,454 A * | 12/1987 | Barnes | ...................... | F16B 1/00 |
| | | | | 24/573.11 |
| 4,723,877 A * | 2/1988 | Erickson | ............... | B23B 29/046 |
| | | | | 279/2.11 |
| 4,747,735 A * | 5/1988 | Erickson | ............... | B23B 29/046 |
| | | | | 279/75 |
| 5,366,313 A * | 11/1994 | LaBarre | ................ | F16B 21/165 |
| | | | | 403/108 |
| 6,152,645 A * | 11/2000 | Sanford | ................ | F16D 41/064 |
| | | | | 403/322.2 |
| 6,299,542 B1 * | 10/2001 | Ouchi | ................... | F16D 3/2245 |
| | | | | 464/139 |
| 7,121,951 B2 * | 10/2006 | Chang | ...................... | F16D 3/20 |
| | | | | 403/322.2 |
| 8,070,377 B2 * | 12/2011 | Wang | ................... | B25B 15/001 |
| | | | | 403/322.2 |
| 8,480,329 B2 * | 7/2013 | Fluhr | ...................... | F41A 11/00 |
| | | | | 403/319 |
| 8,549,965 B2 * | 10/2013 | Erickson | ............... | B23B 29/046 |
| | | | | 408/239 R |

\* cited by examiner

PRIOR ART

PRIOR ART

MECHANICAL COUPLING DEVICES

CROSS-REFERENCE TO RELATED APPLICATIONS

This application is the national stage entry of and claims priority to UK patent application serial number 1404611.4, titled, "IMPROVEMENTS IN OR RELATING TO MECHANICAL COUPLING DEVICES", which was filed on Mar. 14, 2014, the entire specification of which is incorporated herewith by reference in its entirety.

FIELD OF THE INVENTION

The present invention relates to rotary devices, such as wind vanes, anemometers and the like. More particularly, the present invention relates to a mechanical coupling for the same, whereby a wind vane or other rotary component having a coupling where a first coupling member is fixed for rotation with a second coupling member where the relative axial positions of the coupling members with respect to their respective rotational axes must be constant, can be replaced without the use of a tool.

BACKGROUND TO THE INVENTION

Torque from a driving device to a driven device is normally transferred by means of a shaft, being a rotating or stationary component which is normally circular in section. If the shaft is rotating, it is generally transferring power and if the shaft is operating without rotary motion it is simply transmitting torque and is probably resisting the transfer of power, for example an axle of a vehicle. Mechanical components directly mounted on shafts include gears, couplings, pulleys, cams, sprockets, links and flywheels. A shaft is normally supported on bearings. The torque is normally transmitted to the mounted components using pins, splines, keys, clamping bushes, press fits, bonded joints and sometimes welded connections are used. These components can transfer torque to/from the shaft and they also affect the strength of the shaft and must therefore be considered in the design of the shaft.

In the design of a shaft, consideration must be made of the combined effect of all the various forms of loading, such as torque (shear loading), direct shear loading, tensile loading and compressive loading. The design of shafts must include an assessment of increased torque when starting up, inertial loads, fatigue loading and unstable loading when the shaft is rotating at critical speeds. There are many coupling devices in use in research and industry that transfer rotational mechanical power. Known devices comprise a chuck that is adjustable over a relatively wide range. The chuck may be attached to the driver by a threaded or tapered bore or any other suitable means, which will use a grip of the chuck or a key to fasten. However, not only are these mass produced, meaning that they are not balanced as such, they are quite large and are made of steel whereby, in use, provide a substantial amount of inertial resistance, too great for many applications, including metrology, especially in wind direction applications. Additionally, the fastening of a chuck is dependent upon an operator's judgment to apply a correct amount of torque when locking.

Figure 1:
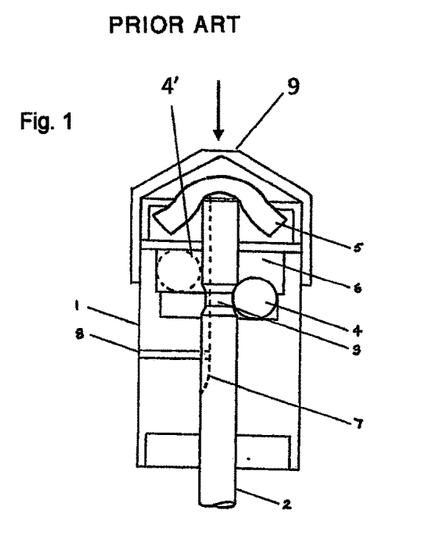
FIG. 1 shows a prior art mechanical coupling device.

FIG. 1 shows a prior art coupling device 1 having a right circular cylindrical chamber with first and a second diameters and a bore, all being concentric with respect to each other, the second diameter being larger than the first diameter. Within the bore, a shaft 2 is a sliding fit, the shaft being operatively positioned therein; the shaft having an annular groove 3 about which, in conjunction with the inside wall of the chamber, about the first diameter, the ball can move, an annular wall of the chamber preventing the relative axial movement of the coupling device with respect to the shaft in one direction; the cap of the coupling device preventing movement in the other axial direction. That is to say, when the ball reaches the position shown in unbroken line in the drawing further outward movement of the shaft is prevented by the locking action of the ball between the sloping side of the groove and the wall and bottom of the chamber. The shaft is then locked in position in the coupling member and cannot be withdrawn while the coupling remains in the vertical position or thereabouts unless vertical acceleration, vibration or magnetic force is used. This pin arrangement has been susceptible to backlash, making the instrument inaccurate.

Release of the coupling element is enabled when the ball is in the position indicated in dashed lines 4', as shown on the left hand side of the shaft 2 in FIG. 1. Conveniently, downward pressure is exerted on the cap 9—in the direction indicated, against resilient element 5, when the coupling arrangement is inverted, gravity being employed to enable the ball to move. Upon relative movement of the coupling device away from the shaft, the ball is not obstructed by the annular groove and thereby relative movement between the coupling device and the shaft is not impeded and the components can be separated. The axial groove 7 in the shaft and engaging pin 8, passing into the bore of the first member is used to prevent relative angular rotation of the two members of the coupling.

This prior system, however, suffers from a number of issues. One first issue is that the coupling device is not necessarily rotationally located with regard to the shaft unless the pin 8 is employed. Another issue is that the ball 4 is susceptible to being adjacent the axial slot 7 and thereby not guaranteeing continued coupling, noting that the ball is shown 180° to the axial groove: to overcome this issue, an extra ball can be employed, but this could cause difficulties in coupling situations where balance is critical factor.

Figure 2:
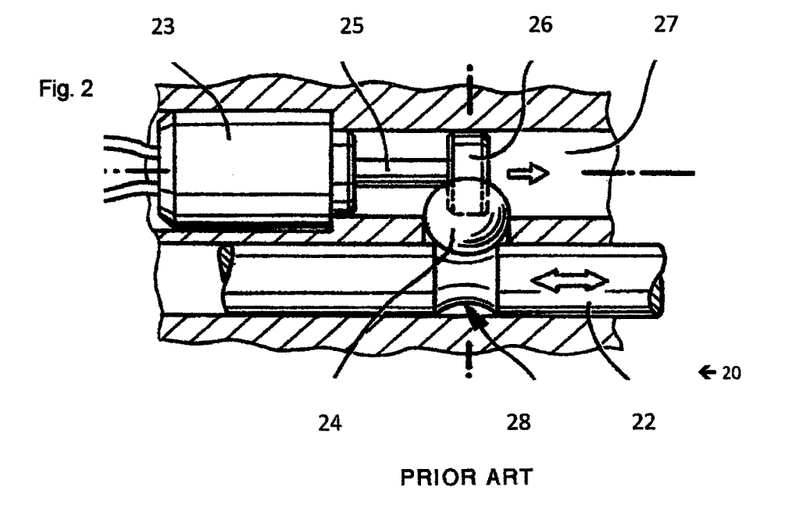
FIG. 2 shows a prior art electro-mechanical coupling device.

DE4338278 relates to a device 20 (per FIG. 2) for locking an axially movable securing pin or bolt 22 by the use of a solenoid 22 in a missile environment, where there is an extreme requirement for a high functional reliability. Specifically, this utility model provides a means for locking the axially movable securing pin or bolt by a ball bearing 27 element, which engages in a locking groove 28 on the circumference of the securing bolt by means of a locking ball 27. The solenoid drives a piston 26 via rod 25 within channel 27, the piston being movable so as to enable locking of the shaft 22 by means of the ball bearing. However, this system relates to a remote, electrically controlled arrangement that cannot be utilized in a rotational coupling arrangement.

OBJECT TO THE INVENTION

The present invention seeks to provide a coupling device which makes a mechanical coupling between a first and a second member such that the locking together and release action is positive, without likelihood of failure, and can be conducted simply and quickly without the use of a tool. The present invention also seeks to provide a coupling which eliminates movement arising from "backlash". The invention also seeks to provide couplings in which a positive axial location of shaft as first member and mating bore in a second member are obtained without reliance on friction forces. The present invention also seeks to provide a coupling arrangement which is capable of transmitting a torque, such couplings being suitable for attaching a rotor to an anemometer or the fin to the shaft of a wind vane. The present invention further also seeks to provide an improved coupling, operable for meteorology applications, which overcomes at least some of the problems that have become apparent with regard to known systems.

SUMMARY OF THE INVENTION

In accordance with a first aspect of the invention, there is provided an axial coupling arrangement between first and second elements, said elements being arranged for rotation about an axis, said first element comprising a general elongate shaft, having a coupling portion arranged about an axial section of the shaft and said second element comprising a body having a bore defined therein, with an coupling portion about an axial section of the bore; said elements being coupled by way of a spheroidal member, the arrangement further comprising a resilient element operable to provide an axial force of separation when the coupling portions are axially aligned: wherein a coupling portion associated with one of the first and second elements comprises a surface operable to provide two point contact surfaces for abutment with the spheroidal coupling member in a coupling mode; wherein a coupling portion associated with the other of the first and second elements comprises a chamber operable to provide three point contact surfaces for abutment with the spheroidal coupling member in a coupling mode, the chamber being operable to retain the locking member in a non-coupling mode; the arrangement being such that, in a coupling mode, the spheroidal member is contacted by the respective contact points, the resilient forces causing forces from the respective contact points to act through the spherical member, preventing separation of the first and second elements, the contact surfaces thereby ensuring defined rotational and axial alignment between the first and second elements. A specific advantage of this system is that it can take into account variation in tolerance, the coupling system ensuring correct axial and radial alignment and is not affected by friction between the component parts. The resilient element can comprise one of a helical spring, resilient plastics or rubber/elastomer compound.

Conveniently, the spheroidal member is a sphere. This has the advantage that the sphere has no preferred axes of orientation. In order for the spheroidal member to be retained within the body of the coupling element, it is preferred that the coupling portion with the chamber is provided with an elongate aperture, which aperture has an axial width less than the smallest diameter of spheroidal member. Conveniently, the axial coupling has a bore that is circularly cylindrical and the shaft is circularly cylindrical. For an arrangement comprising a shaft and a bore, it is preferred that the body with a bore supports the coupling element with the spheroidal element within, wherein the resilient element comprises one of a helical spring, resilient plastics or rubber/elastomer compound. The axial coupling may have either or both of the bores non-circularly cylindrical. In order to balances forces of alignment, the system may have two oppositely directed locking members arranges opposite each other; equally, provided there is room for such an arrangement, three or more locking members can be provided, to enable forces to be balanced.

The axial coupling portion operable to provide two point contact surfaces comprises a depression in the surface of the of said first or second element with a curved edge, inclined to said axis of rotation, said curved perimeter providing said two point contact surfaces with respect to the spheroidal member. This can simply be manufactured by the use of a twist drill operating at an angle to the axis of the shaft. Equally the depression can be milled out, although milling is more appropriate to define, for example a "V" shaped ridge for providing the two contact points. By the use of ridge in the shape of a portion of an elliptical shape, a "V" shape or even a semi-circular shape, different sizes of spheroidal members can be employed, within limits to provide locking members.

The coupling portion operable to provide three point contact surfaces conveniently comprises a first chamber volume comprising a cavity large enough to retain the spheroidal member in an uncoupled state and a second chamber volume acting to position the spheroidal member outwardly of the surface associated with the coupling portion in a coupled state, the second chamber volume having a first point contact point defined by a wall arranged generally perpendicularly with respect to the axis to limit axial movement by the spheroidal member and second and third contact points facing the coupling interface, the second and third contact points determining the extent that the spheroidal member extends from the coupling wall. The second and third contact points can be defined by two planar surfaces arranged in a general "V" formation, the base of the "V" arranged in a plane passing through said axis of rotation. In the alternative, the contact points can be defined by a curved surface—even a conical surface.

In the limit, the first and second contact points of the first coupling member can lie on the same curve if the curve corresponds with the diameter of the spheroidal element, such the two contact points comprise one elongate curve contact portion. Equally, the second and third contact points of the other coupling member can lie on the same curve if the curve corresponds with the diameter of the spheroidal element, such that the two contact points comprise one elongate curve contact portion. In another embodiment, the second and third contact points are defined by curviplanar surface arranged in a general "U" formation, the base of the "U" arranged in a plane passing through said axis of rotation. The present invention can also comprise an axial coupling arrangement wherein there are two or more coupling arrangements arranged symmetrically about a shaft and bore arrangement.

In accordance with a further aspect of the invention, there is provided a wind vane transfer body or other rotary electric/electronic angular rotational transducer/encoder that incorporates such an axial coupling.

BRIEF DESCRIPTION OF THE DRAWINGS

Embodiments of the invention will now be described, by way of example only, with reference to the drawings, in which.

DESCRIPTION OF THE PREFERRED EMBODIMENTS

There will now be described, by way of example only, the best mode contemplated by the inventor for carrying out the present invention. In the following description, numerous specific details are set out in order to provide a complete understanding to the present invention. It will be apparent to those skilled in the art, that the present invention may be put into practice with variations of the specific.

Figure 3A:
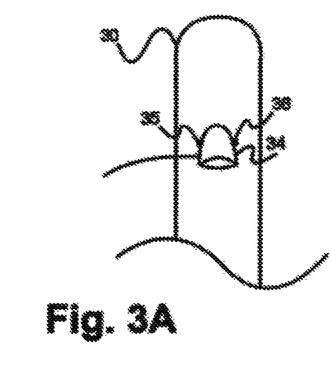
FIG. 3A and FIG. 3B shows, respectively, a perspective and an axial sectional views through the coupling arrangement.
Figure 3B:
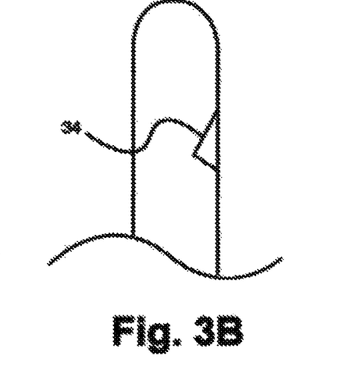

FIGS. 3A and 3B show, respectively a perspective side view and a sectional view of a distal portion shown of a spindle, which is associated with an aperture associated with a second central element. Reference shall now be made to FIG. 3A, which comprises a view of a connection portion of a first central element 30 of a first embodiment of the present invention. A half elliptical edge contour 34 defines a contact portion for providing two contact ridges and, in turn two contact points 35, 36 with respect to a ball coupling member, the radial separation of the lines about the shaft being less than the diameter of the ball coupling member, the plane of the elliptical line being at an angle to the axis of rotation of the shaft, although, in the limit, if the ellipse at the root, corresponds to an arc of a circle of the spheroid. This half elliptical edge contour can be simply fabricated by drilling a circular bit at an oblique angle with respect to the outside surface of the first element, the axes of the drill bit and the first central element lying in the same plane. Note that the angle can also be considered as an acute angle as between the drill bit and the axis of the locking element. By having the width of the ellipse less than a diameter of a locking ball, the ball will then, in locking mode (see below) rest upon opposing side portions of an elliptical ridge. In an exemplary embodiment, this comprises a shaft which is coupled to a wind vane, where the advantages of maintaining relative position between a vane and an indicator/recording device of wind direction; as an example, when used in connection with the control of wind turbines, not only does the correct orientation increase efficiency, it also reduces the potential of adverse effects acting upon the wind turbine installation.

Figure 4:
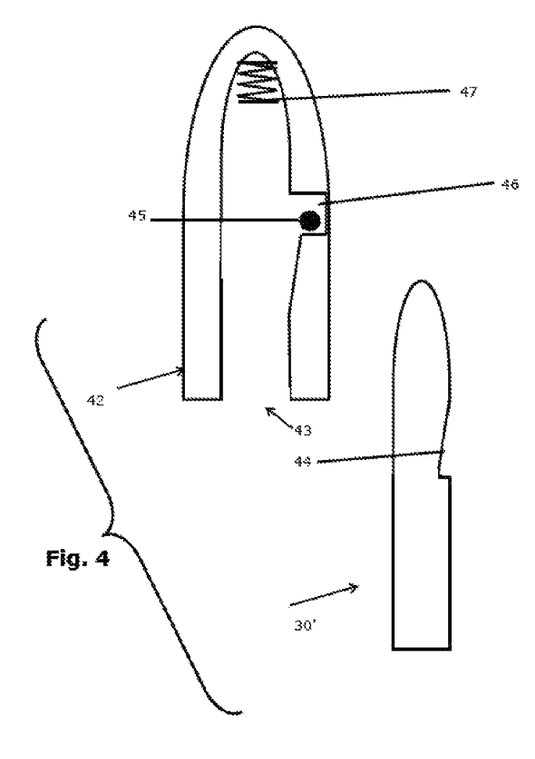
FIG. 4 shows a first embodiment with coupling components uncoupled.

Reference shall now be made to FIG. 4 which shows the first element 30' and second element 42; the underside of the second element comprises a bore or aperture 43 into which the first element is inserted, to enable connection therebetween. The first element has a locking region 44 defining, in a first embodiment, a curved line ridge or elliptical ridge, although details of the curved line are not apparent from this figure. A spheroidal element can act as a locking element, such as a ball bearing 45, which is shown in a cavity 46 associated with the second element. Although not shown, an inside liner element associated with resilient element 47, such as a coil spring, elastomeric plastics etc. covers the aperture when the biasing element is in a rest state, to ensure that the locking element does not become separated. The generally right circularly cylindrical body of the second element is provided with an axial cylindrical channel to enable passage of the circular section shaft 30' therethrough, conveniently by way of a sliding fit.

Figure 5:
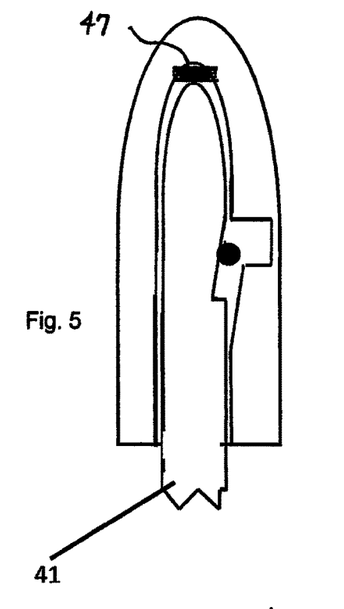
FIG. 5 shows a first embodiment with one coupling element inserted into the bore of the other coupling element.
Figure 6:
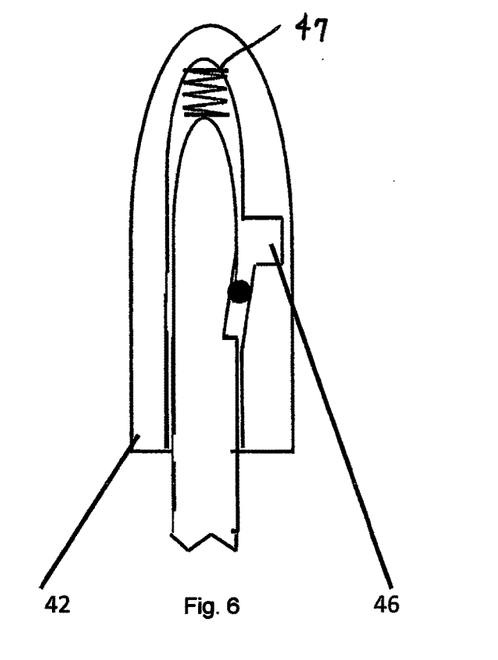
FIG. 6 shows a first embodiment with coupling components coupled.

With reference to FIG. 5, the first element 30' has been introduced to such an extent that the distal element of the first element is compressed against the resilient element 47 of the second element 42 whereby to allow the locking member 45 to enter the gap defined between the adjacent locking regions of the first and second elements.

Figure 7A:
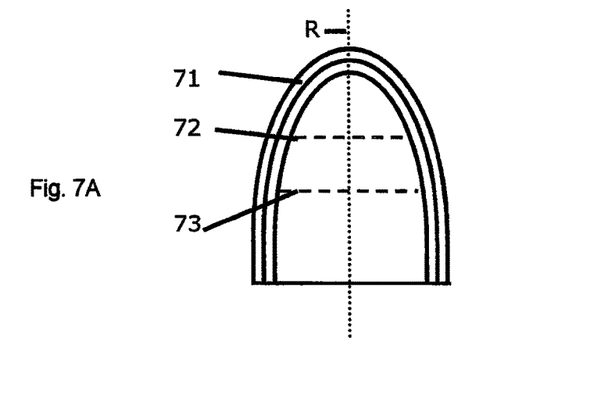
FIG. 7A shows a second embodiment in sectional view.
Figure 7B:
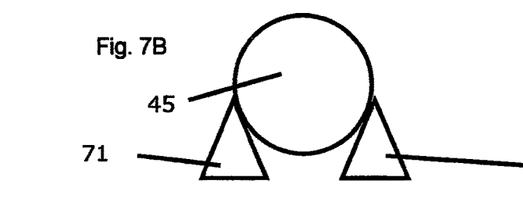
FIG. 7B and FIG. 7C show further detail of a second embodiment in a sectional view.
Figure 7C:
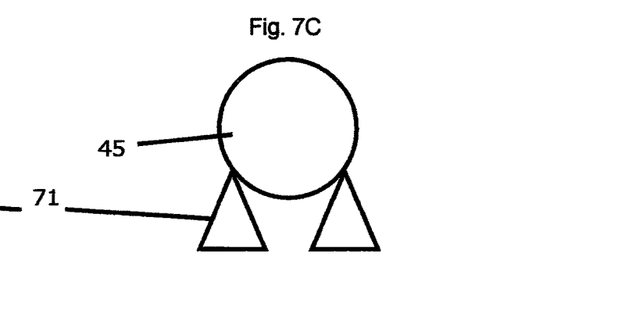

FIG. 7A shows a view of a locking member comprising a curved line ridge, which has a symmetry of reflection R, so that a locking member is conveniently positioned within the middle of a locking member, so that correct placement of the first and second element is ensured. Dotted lines 72 and 73 correspond to the cross-sections shown in FIGS. 7B and 7C, respectively, with a locking member 45 also shown to enable a greater understanding to be gained. With reference to FIGS. 7B and 7C, the ridges are shown as being sharp angles, but this is not necessarily the case and the peaks of the ridges can be rounded. Equally, the ridges could be defined by a pair of rectilinear lines which converge—but do not need to meet.

Figure 8:
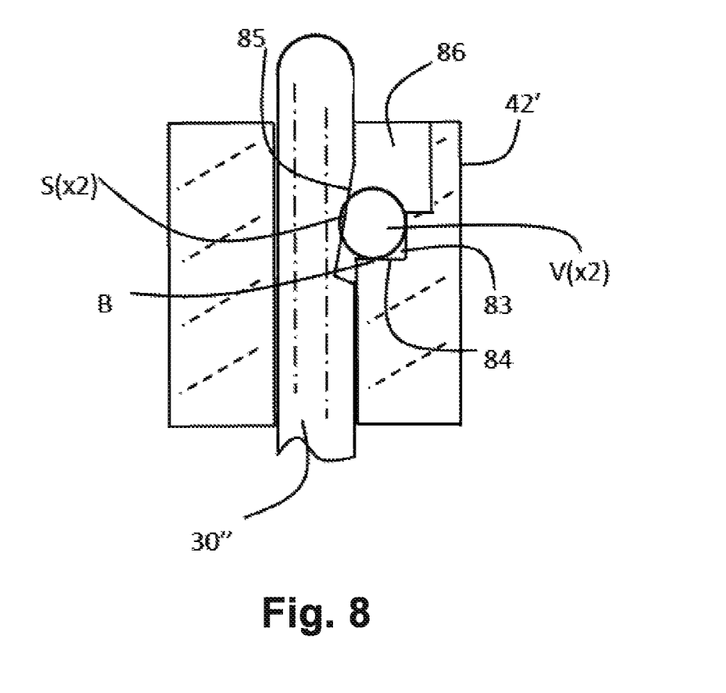
FIG. 8 shows an orthogonal cross-sectional view through the embodiment shown in FIG. 7A.
Figure 8A:
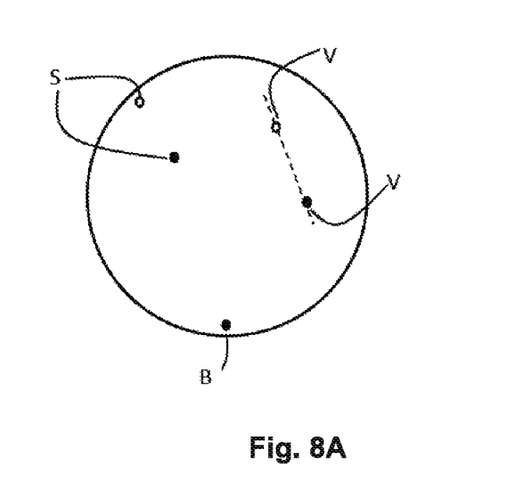
FIG. 8A shows a view of a locking ball with contact portions indicated.

A first alternative is shown with reference to FIGS. 8 and 8A. Shaft 30" includes a curved ridge element 85 in its locking area, whereby to provide two contact areas indicate by reference letter S in this part sectional/isometric view. Opposite the locking member of the first element, the second element 42' is provided with a first spheroid receiving chamber 83, defined by a "V"-channel (although not apparent form this view) having recti-planar sides—although a curved section could also be provided—and a recti-planar base 84, with the base of the "V" lying in an axis that is parallel with the axis of rotation of the coupling elements and the plane of the base 84 being substantially orthogonal to said axis of rotation. FIG. 8A shows a view of the locking ball 45 with two contact portions with the first element 30" being indicated by the reference letter S; two upper contact portions of the locking ball with respect to the inside wall of the chamber being indicated by the reference letter V; and the base contact portion of the locking ball with respect to base of the chamber being indicated by the reference letter B.

Figure 9A:
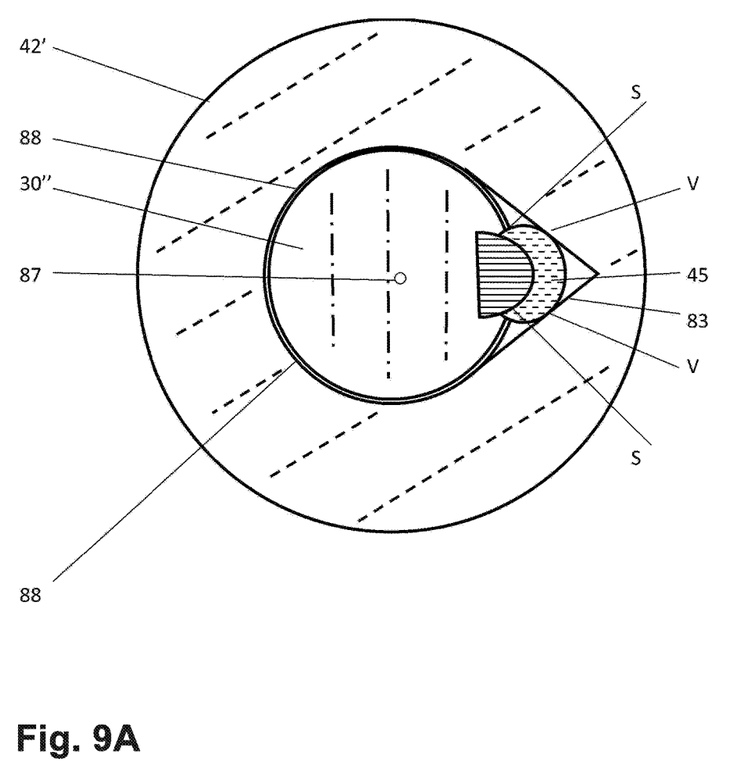
FIG. 9A shows an axial sectional view of the embodiment shown in FIG. 7.

FIG. 9A shows a part sectional—part perspective view through the locking arrangement comprising the first coupling element 30'" being a circular cylindrical element with an axis 87, surrounded by a second coupling element comprising a body 42' with a bore defined therethrough and where spheroidal element 45 (conveniently a ball bearing) abutting walls 83 of the locking area of a coupling arrangement view through at contact points V.

Figure 9B:
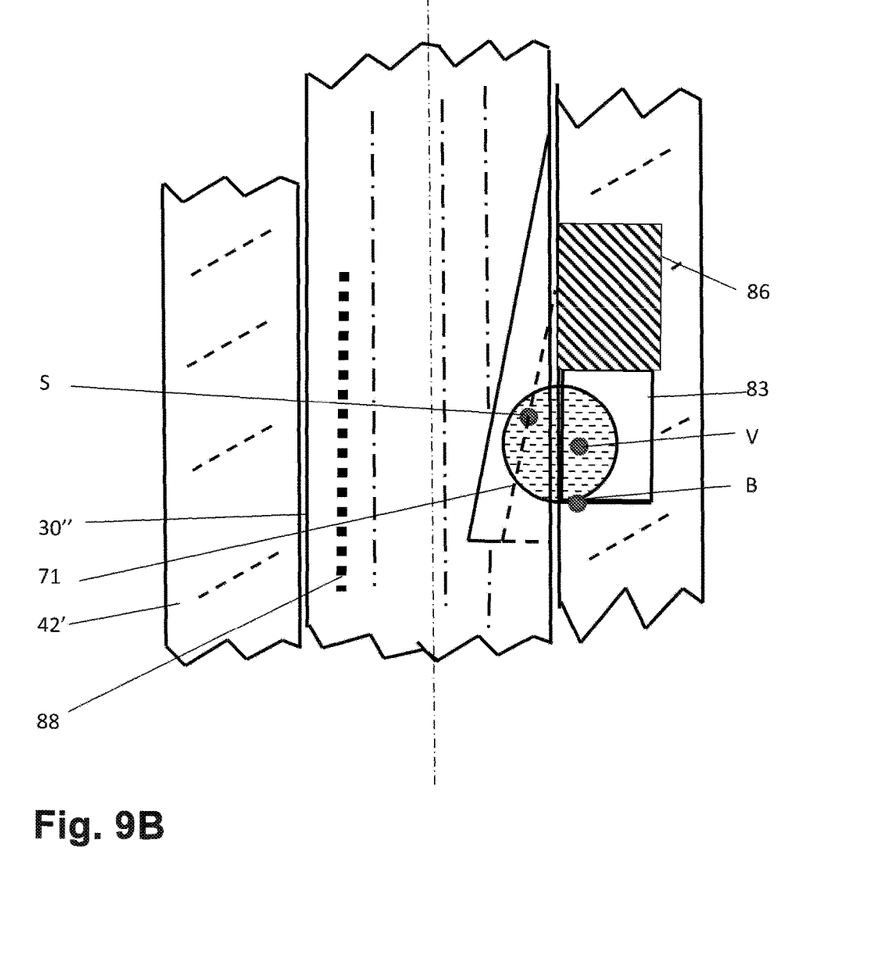
FIG. 9B shows a further sectional view with contact points indicated.

With reference to FIG. 9B, the (partial) ellipse 71 is shown at an inclined angle to the rotational axis shown in dot-dash line style. A second volume 86 provides sufficient room so that the locking member 45 can lie therewithin when in an unlocked state. It will be appreciated that opposite the area of the coupling, that a volume of the body must be removed to ensure that the body is balanced. Dotted lines 88, indicate lines of contact or indicate where two contact points would be, either side of the coupling portion 83, as is the case when there is one locking member. However, it will also be appreciated that the bore could be provided with two locking arrangements, arranged opposite one with respect to the other; further locking arrangements could be provided if arranged symmetrically about the circumference. This also enables the bore not to be restricted to a circularly cylindrical bore. The coupling portion operable to provide two point contact surfaces thus comprises a depression in the surface of the of the respective element with a curved edge, inclined to said axis of rotation, said curved perimeter edge providing said two point contact surfaces with respect to the spheroidal member. The curve is defined by an elliptical path having a major axis of ellipse which lies in a plane which passes through said axis of rotation.

The embodiments shown have provided the body with the volume for retaining the locking spheroidal element, but it will be appreciated that the roles of the axial element and outside element with respect to their functions can be interchanged. It will also be appreciated that the ellipse form is defined by two side-by-side elements which follow an elliptical path yet do not meet, since the securement member will be contacted by two point contacts.

For applications that include meteorological use, it will be appreciated that the materials selected are suitable weather resistant. The coupling member, for anemometer uses will need to have a low mass so that torque issues required to overcome a starting inertia are minimized. Accordingly an aluminum alloy, such as a 6000 series alloy has been found to be suitable, with anodizing performed upon suitably prepared finish, with no scratches or blemishes, and all external surfaces free of sharp edges and burr-free. The shaft can conveniently be manufactured with from a stainless steel, for example a 303-grade stainless steel or, in particularly hostile environment 316-grade, a grade suitable for marine environments. A benefit of having the design common to a manufacturer of meteorological equipment for both a wind vane and an anemometer is that stock levels and supplies of equipment can be rationalized; reducing overheads and enabling simple recognition of stock for personnel.

It will be appreciated that there are numerous applications outside the field of metrology. One application could be a removable graduated knob or dial having fine graduations, used for adjusting or setting a mechanism such as a gun sight, rangefinder or other optical device, where a dial could be removed once adjustment had been performed and the equipment can be used, which is important, for example, where size and/or position of adjustment means could impede operation. In another example of use, a removable dial with short integral shaft could be used as a key, for instance to set a series of magnets in a ship's compass; in the case of an analogue electronic amplifiers having graduated gain control knobs on a substantially horizontal console need to be removed to obtain access behind the panel for servicing. In control systems where there is limited space available and or use intended by authorized users, a single dial control/coupling member could serve a number of closely spaced transducers having rotary coupling members of the other part.

What is claimed is:

1. A rotational and axial coupling arrangement between first and second elements, the elements being arranged for rotation about an axis, the first element comprising an elongate shaft, having a coupling portion arranged about an axial section of the shaft and said second element comprising a body having a bore defined therein, with a coupling portion about an axial section of the bore;
    said elements being coupled by way of a spheroidal member, the arrangement further comprising a resilient element operable to provide an axial force of separation when the coupling portions are axially aligned:
    wherein the coupling portion associated with one of the first and second elements comprises a surface defining two opposing linear ridges operable to provide first and second point contact points for abutment with the spheroidal coupling member in a coupling mode;
    wherein the coupling portion associated with the other of the first and second elements comprises a chamber operable to provide three point contact surfaces for abutment with the spheroidal coupling member in a coupling mode, the chamber being operable to retain the locking member in a non-coupling mode;
    the arrangement being such that, in a coupling mode, the spheroidal member is contacted by the respective contact points, the resilient forces causing forces from the respective contact points to act through the spherical member, preventing separation of the first and second elements, the contact surfaces thereby ensuring defined rotational and axial alignment between the first and second elements.

2. The axial coupling according to claim 1, wherein the spheroidal member is a sphere.

3. The axial coupling according to claim 1, wherein the first and second contact points of the coupling member comprising two opposing linear ridges lie on the same curve and the curve corresponds with the diameter of the spheroidal element, such the two contact points comprise one elongate curve contact portion.

4. The axial coupling according to claim 1, wherein the coupling portion with the chamber is provided with an elongate aperture, which aperture has an axial width less than the smallest diameter of spheroidal member.

5. The axial coupling according to claim 1, wherein the coupling portion with the chamber is associated with the second element.

6. The axial coupling according to claim 1, wherein the coupling portion operable to provide two point contact surfaces comprises a depression in the surface of the first or second element with a curved edge, inclined to said axis of rotation, said curved edge providing said two linear surfaces to provide two contact points with respect to the spheroidal member.

7. The axial coupling according to claim 1, wherein the coupling portion operable to provide two point contact surfaces comprises a depression in the surface of the of said first or second element with a "V" shape perimeter, inclined to said axis of rotation, said "V" perimeter providing said two point contact surfaces with respect to the spheroidal member.

8. The axial coupling according to claim 1, wherein the coupling portion operable to provide two point contact surfaces comprises a depression in the surface of the first or second element with a "V" shape perimeter, inclined to said axis of rotation, said "V" perimeter providing said two point contact surfaces with respect to the spheroidal member and wherein the "V" perimeter has arms of equal length and an axis midway therebetween is arranged such that said axis of the "V" lies in a plane which passes through said axis of rotation.

9. The axial coupling arrangement according to claim 1, wherein the resilient element comprises one of a helical spring, resilient plastics or rubber/elastomer compound.

10. The axial coupling arrangement according to claim 1, the first and second contact points of the first coupling member lie on the same curve and the curve corresponds with the diameter of the spheroidal element, such the two contact points comprise one elongate curve contact portion.

11. The axial coupling arrangement according to claim 1, wherein there are two or more coupling arrangements arranged symmetrically about a shaft and bore arrangement.

12. A rotary component arrangement comprising an axial coupling arrangement in accordance with claim 1.

13. A wind vane coupling arrangement comprising an axial coupling arrangement in accordance with claim 1.

* * * * *